United States Patent
Helskens et al.

(10) Patent No.: US 10,793,477 B2
(45) Date of Patent: Oct. 6, 2020

(54) ENHANCED CERAMIC COATING

(71) Applicants: Jan Helskens, Destelbergen (BE); THERMOLON KOREA CO., LTD., Busan (KR)

(72) Inventors: Jan Helskens, Destelbergen (BE); Park Chung Kwon, Busan (KR)

(73) Assignee: THERMOLON KOREA CO., LTD., Busan (KR)

( * ) Notice: Subject to any disclaimer, the term of this patent is extended or adjusted under 35 U.S.C. 154(b) by 268 days.

(21) Appl. No.: 15/572,514

(22) PCT Filed: May 23, 2016

(86) PCT No.: PCT/EP2016/061556
§ 371 (c)(1),
(2) Date: Nov. 8, 2017

(87) PCT Pub. No.: WO2016/188946
PCT Pub. Date: Dec. 1, 2016

(65) Prior Publication Data
US 2018/0170815 A1    Jun. 21, 2018

(30) Foreign Application Priority Data

May 22, 2015   (EP) ..................................... 15168906

(51) Int. Cl.
C04B 35/00    (2006.01)
C04B 35/624   (2006.01)
(Continued)

(52) U.S. Cl.
CPC ............ C04B 35/624 (2013.01); B05D 3/002 (2013.01); B05D 3/0254 (2013.01); B05D 7/542 (2013.01);
(Continued)

(58) Field of Classification Search
None
See application file for complete search history.

(56) References Cited

U.S. PATENT DOCUMENTS

| 6,319,108 B1 | 11/2001 | Adefris et al. | |
|---|---|---|---|
| 2008/0017074 A1* | 1/2008 | Park | A47J 36/04 106/404 |
| 2014/0120284 A1* | 5/2014 | Perillon | A47J 36/06 428/35.9 |

FOREIGN PATENT DOCUMENTS

| CN | 103 205 201 A | 7/2013 |
|---|---|---|
| CN | 103254767 A | 8/2013 |

(Continued)

OTHER PUBLICATIONS

KR-20030078841-A—english translation (Year: 2003).*
(Continued)

*Primary Examiner* — Stefanie J Cohen
(74) *Attorney, Agent, or Firm* — Amster, Rothstein & Ebenstein LLP

(57) ABSTRACT

The present invention relates to an enhanced ceramic coating, ECC, composition comprising a non-stick ceramic coating composition, CCC, and 0.2 wt %-2 wt % diamond additive, DA with wt % compared with the total weight compared to the ECC composition. It also relates to a method of coating an artefact with the ECC, and an artefact provided 5 with a dry film coating containing an ECC prepared using an ECC composition of the invention. An artefact coated with the ECC has the combined advantages of durable non-stick, scratch resistance and abrasion resistance.

21 Claims, 4 Drawing Sheets

(51) Int. Cl.
  *C09D 1/00* (2006.01)
  *B05D 3/00* (2006.01)
  *B05D 3/02* (2006.01)
  *B05D 7/00* (2006.01)
  *C04B 35/14* (2006.01)
  *C04B 35/515* (2006.01)
  *C08K 3/04* (2006.01)
  *C08K 3/02* (2006.01)
  *C08K 3/34* (2006.01)
  *C08K 3/36* (2006.01)

(52) U.S. Cl.
  CPC ............ *C04B 35/14* (2013.01); *C04B 35/515* (2013.01); *C09D 1/00* (2013.01); *C04B 2235/3418* (2013.01); *C04B 2235/38* (2013.01); *C04B 2235/427* (2013.01); *C08K 3/02* (2013.01); *C08K 3/04* (2013.01); *C08K 3/346* (2013.01); *C08K 3/36* (2013.01)

(56) References Cited

FOREIGN PATENT DOCUMENTS

| | | |
|---|---|---|
| EP | 2 728 040 A1 | 5/2014 |
| KR | 20030078841 A * | 10/2003 |
| WO | 01/04227 A2 | 1/2001 |

OTHER PUBLICATIONS

KR-20030078841-A—english translation—abstract (Year: 2003).*
PCT International Search Report and Written Opinion dated Jul. 13, 2016 for PCT International Patent Application No. PCT/EP2016/061556, 10 pages.
PCT Notification of Transmittal of the International Preliminary Report on Patentability dated Jun. 21, 2017 for PCT International Patent Application No. PCT/EP2016/061556, 8 pages.
Response filed by Applicant dated Jun. 2, 2017 in connection with PCT International Patent Application No. PCT/EP2016/061556, 14 pages.

* cited by examiner

ENHANCED CERAMIC COATING

CROSS-REFERENCE TO RELATED APPLICATIONS

This application is a U.S. national stage entry under 35 U.S.C. § 371 of PCT International Patent Application No. PCT/EP2016/061556, filed May 23, 2016, which claims priority to European Patent Application No. 15168906.4, filed May 22, 2015, the contents of which are incorporated herein by reference in their entirety.

FIELD OF THE INVENTION

The present invention relates to an enhanced ceramic coating and enhanced ceramic coating composition for an artefact that provides a durable and long-lasting non-stick property, in addition to improved hardness, abrasion resistance and scratch resistance. It also relates to an artefact coated with the enhanced ceramic coating. It also relates to a use of the enhanced ceramic coating for coating an artefact, for instance a cookware item.

BACKGROUND OF THE INVENTION

Non-stick coatings have many applications, for instance, in cookware such as pots, pans and cooking utensils, as well as in various types of heaters (e.g. wood burning stoves, heating boilers, infra-red heaters etc), fans, refrigerators, irons, building materials, health aids, personal care products such as hair straighteners, curling tongs, and industrial products, etc. A problem in the art is that the coatings for use in cookware need to withstand surface abrasions and scratches and exposure to cooking temperatures, whilst maintaining a non-stick function and without degradation. Indeed, heat and heat shock damage contribute to the loss of the non-stick effect over time, causing e.g. a loss of structural integrity of the coating surface. In this context, the HomeWorld Forecast 2014, a consumer survey, concluded that about 53% of respondents stated they would purchase ceramic non-stick cookware in a next cookware purchase. Almost half of the consumers stated that it is most important that a non-stick surface hold its easy food release (non-stick) properties over time.

EP2728040 discloses a diamond containing ceramic coating composition comprising colloidal silica, methyltriethoxysilane, demineralized water, isopropanol, nonreactive silicone oil, pigment and diamond powder. While the cured coating has an improved scratch resistance and thermal conduction properties, EP2728040 is silent on the durability of the non-stick properties. In fact, the addition of silicone oil to a sol gel aims to improve its non-stick properties. However, the benefit is temporary and the initial excellent non-stick properties are lost quickly.

Whilst ceramic non-stick coatings are known in the art for having improved stability at higher temperature, there remains a need in the art for further and/or improved coating having an improved durability of the non-stick performance, for instance for use on any artefact, in particular for non-stick coatings, in particular on a cookware item.

The present coating compositions and coatings aim to overcome the problems in the art.

SUMMARY OF THE INVENTION

Through extensive experimental formulation and testing, the present inventors have realised an enhanced ceramic coating (ECC) composition overcoming at least some of the problems of the prior art, particularly which has a durable and use-resistant non-stick effect.

In a first aspect, the present invention relates to an enhanced ceramic coating composition, or ECC composition which forms an enhanced ceramic coating, ECC, when applied on an artefact comprising:
  a non-stick ceramic coating composition, CCC, i.e. a ceramic coating composition which forms a ceramic coating with non-stick properties; and
  0.2 wt %-2 wt % of a diamond additive,
with wt % compared with the total weight of the enhanced ceramic coating ECC composition,
wherein the ECC has a non-stick durability of a least 17 cycles, wherein the non-stick durability of a coating is measured by determining the number of cycles required to reduce the non-stick grade of the coating from 5 to 1, wherein the non-stick grade is determined by performing a Fried Egg Test according to the Cookware Manufacturers Association Standard before and after each cycle and wherein each cycle comprises in sequence an ENV12875-1:1998 standard Dishwasher test, a first temperature treatment (260° C. for 10 min), quenching, and a second temperature treatment (260° C. for 10 min).

Stated differently, the present invention relates to an enhanced ceramic coating composition, or ECC composition which forms an enhanced ceramic coating, ECC, when applied on an artefact comprising
  a non-stick ceramic coating composition or CCC; and
  0.2 wt %-2 wt % diamond additive, DA.
with wt % compared with the total weight compared to the ECC composition; wherein the durability of the non-stick property of said enhanced ceramic coating is at least 20% longer than the durability of the non-stick property of the ceramic coating from the CCC in the absence of diamonds, wherein the durability of the non-stick property of the coating can be measured as further defined herein.

In particular embodiments, the non-stick CCC may comprise silica or zirconia. The non-stick CCC may be present at more than 90 wt %, with wt % compared with the total weight of the ECC composition. The DA may comprise diamond particles and mica particles in a weight ratio diamond particles:mica particles between 1:0 and 1:3, preferably 1:2 to 3.

The non-stick CCC may be a non-stick inorganic ceramic coating composition, a non-stick hybrid ceramic coating composition, or a non-stick sol-gel ceramic coating composition.

In particular embodiments, the non-stick CCC is a sol-gel composition comprising:
  (a) 11-20 wt % of a silane or an oligomer thereof as a binder;
  (b) 19.5-41.5 wt % of a silica mixture;
  (c) 0-19 wt %, preferably 3-19 wt % of a functional filler;
  (d) 2-15 wt % of a ceramic powder that emits far infrared radiation and anions;
with wt % compared with the total weight of the non-stick CCC.

A particularly advantageous non-stick CCC, which upon addition of a DA as envisaged herein results in an ECC with optimal or maximal non-stick durability, is a sol-gel comprising:
  (a) 11-20 wt % of a silane or an oligomer thereof as a binder;
  (b) 19.5-41.5 wt % of a silica mixture;
  (c) 3-19 wt % of a functional filler; more preferably 3-15 wt % of a functional filler;

(d) 2-15 wt % a ceramic powder that emits far infrared radiation and anions; and (e) 0-25 wt % pigment that produces colour;

with wt % compared with the total weight of the sol-gel CCC.

In preferred embodiments, said ceramic powder that emits far-infrared radiation and anions comprises a far-infrared radiation-emitting material and an anion-emitting element.

In a second aspect, the present invention also relates to a use of an enhanced ceramic coating, ECC, composition as defined herein for coating an artefact, in particular a cookware item.

In a third aspect, the present invention also relates to an artefact, in particular a cookware item, provided with a dry film coating containing an ECC prepared using an ECC composition as defined herein, wherein the ECC has a non-stick durability of a least 17 cycles as detailed herein, or stated differently, wherein the durability of the non-stick property of said enhanced ceramic coating is at least 20% longer than the durability of the non-stick property of the ceramic coating from the CCC in the absence of diamonds, wherein the durability of the non-stick property of the coating can be measured as further defined herein.

In particular embodiments, the total thickness of the dry film on the artefact, in particular a cookware item, is 20-60 μm. In particular embodiments, the dry film contains the ECC as a top coat, and the dry film may have a scratch resistance of 10 to 15 N as measured by (British Standard) BS7069. In particular embodiments, the dry film contains the ECC as a top coat, and the dry film has an abrasion resistance of 20 000 to 90 000 cycles using a force of 45 N according to BS7069. In particular embodiments, the dry film may contain the ECC as a top coat, and the dry film may have a pencil hardness of greater than or equal to 10H at room temperature and at 200° C. according to EN 12983-1:1999. In particular embodiments, the dry film contains the ECC as a top coat, and the dry film may have a thermal conductivity of 2.4 to 2.6 $W \cdot m^{-1} K^{-1}$ measured according to ASTM E-1461.

In a fourth aspect, the present invention also relates to a method for coating an artefact substrate surface comprising the steps:

A) roughening of the substrate surface,

B) applying a base coat of a ceramic coating composition to the substrate,

C) applying a top coat of ECC as envisaged herein over the wet base coat, and

D) curing the base coat and top coat to obtain a dry film coating of the artefact.

In a fifth aspect, the present invention also relates to a method for obtaining an artefact coated with an enhanced ceramic coating, ECC, comprising the steps of:

providing a first solution comprising a silica mixture, a functional filler, a ceramic powder that emits far-infrared ray-radiation and anions in a first container;

providing a second solution comprising silane or an oligomer thereof as a binder in a second container;

pre-agitating the first solution in the first container and the second solution in the second container;

mixing the first solution and the second solution, thereby obtaining a non-stick ceramic coating composition, CCC, having a composition as described herein;

agitating the non-stick CCC;

maturing the non-stick CCC;

adding the diamond additive, DA, to the non-stick CCC to obtain an enhanced ceramic coating, ECC, composition containing 0.2 wt %-2 wt % DA filtering the ECC;

applying the ECC onto the artefact as a base coating or a further coating, preferably as a top coating; and curing the ECC, thereby obtaining an artefact coated with a film containing the ECC.

In another aspect, the present invention relates to a method for improving the non-stick durability of a ceramic coating comprising adding 0.2 wt %-2 wt % diamond additive to a ceramic coating composition (CCC), thus obtaining an ECC composition, with wt % compared to the total weight of the ECC composition. In particular embodiments, said ceramic coating composition (CCC) is a sol-gel CCC comprising (a) 11-20 wt % of a silane or an oligomer thereof as a binder; (b) 19.5-41.5 wt % of a silica mixture; (c) 0-19 wt %, preferably 3-19 wt % of a functional filler; and (d) 2-15 wt % a ceramic powder that emits far infrared radiation and anions; with wt % compared with the total weight of the CCC.

In particular embodiments, said diamond additive comprises diamond particles and mica particles in a weight ratio diamond particles:mica particles between 1:0 and 1:3, preferably between 1:2 and 1:3.

Some further embodiments of the present invention include an enhanced ceramic coating, ECC, composition comprising a non-stick ceramic coating composition, CCC, and 0.2 wt %-2 wt % diamond additive, DA, with wt % compared with the total weight compared to the ECC. In certain embodiments of the ECC composition, said non-stick CCC comprises silica or zirconia. In certain embodiments of the ECC composition, said non-stick CCC is present at more than 90 wt %, with wt % compared with the total weight of the ECC composition. In certain embodiments of the ECC composition, said diamond additive comprises diamond particles and mica particles in a weight ratio diamond particles:mica particles of 1:0 to 3, preferably 1:2 to 3. In certain embodiments of the ECC composition, said non-stick CCC is a non-stick inorganic ceramic coating composition, a non-stick hybrid ceramic coating composition, or a non-stick sol-gel ceramic coating composition. In certain embodiments of the ECC composition, said non-stick CCC comprises: (a) 11-20 wt % of a silane or an oligomer thereof as a binder; (b) 19.5-41.5 wt % of a silica mixture; (c) 0-19 wt % of a functional filler; (d) 2-15 wt % a ceramic powder that emits far infrared radiation and anions; and with wt % compared with the total weight of the non-stick CCC.

Other further embodiments of the present invention include an artefact, in particular a cookware item, provided with a dry film coating containing an ECC prepared using an ECC composition comprising a non-stick ceramic coating composition, CCC, and 0.2 wt %-2 wt % diamond additive, DA, with wt % compared with the total weight compared to the ECC. In certain embodiments of the artefact, the total thickness of the dry film is 20-60 μm. In certain embodiments of the artefact, the dry film contains the ECC as a top coat, and the dry film has a scratch resistance of 10 to 15 N as measured by BS7069. In certain embodiments of the artefact, the dry film contains the ECC as a top coat, and the dry film has an abrasion resistance of 20 000 to 90 000 cycles using a force of 45 N according to BS7069. In certain embodiments of the artefact, the dry film contains the ECC as a top coat, and the dry film has a pencil hardness of greater than or equal to 10H at room temperature and at 200 deg C. according to EN 12983-1:1999. In certain embodiments of the artefact, the dry film contains the ECC as a top coat, and the dry film has a thermal conductivity of 2.4 to 2.6 $W \cdot m^{-1} K^{-1}$ measured according to ASTM E-1461.

LEGENDS TO THE FIGURES

DETAILED DESCRIPTION OF THE INVENTION

Figure 1:
FIG. 1 is a photograph of the topside of two round frying pans of different diameters coated according to the invention.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

All documents cited in the present specification are hereby incorporated by reference in their entirety.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to an enhanced ceramic coating (ECC) and ECC composition that has an improved durability of the coating's non-stick properties or non-stick release performance, in addition to enhanced properties of hardness, abrasion resistance and scratch resistance as well as enhanced durability when exposed to the conditions that prevail when in normal domestic use for which such articles are intended. Additionally, the coating may contain reflective particles that allow a user to determine the cleanness of the artefact surface. As envisaged herein, the ECC is non-stick, i.e. products, such as food during/after preparation, are easily released from the surface of the ECC. The ECC and ECC composition finds many applications, for instance, in non-stick cookware, specifically, pots and pans for the oven or stove-top. The applications include those where a non-stick property is advantageous, such as clothes irons, hair care products such as hair straighteners and curling irons. The applications include those where a non-stick property is not a requirement, such as in wood-burning-stoves, heating boilers, heaters in general. Other applications include health aids, building materials and industrial products.

By extensive experimental testing, the present inventors have realised an enhanced ceramic coating and enhanced ceramic coating composition as described herein having a marked increase of the longevity of the non-stick property or the non-stick release performance compared to conventional (non-diamond) non-stick ceramic coatings, or, stated differently, wherein the non-stick properties of the coating have a superior wear resistance. Surprisingly, the present inventors found that the addition of low levels of diamonds (even below 1 wt %) to a non-stick ceramic coating composition allowed to obtain a ceramic non-stick coating which combines a significant and synergistic increase in the durability and longevity of the non-stick properties with an increased abrasion and scratch resistance, increased hardness and an increased thermal conductivity (leading to more homogenous heating).

A first aspect of the present invention generally provides an enhanced ceramic coating (ECC) and ECC composition comprising diamond particles wherein the coating when applied on an artefact has an increased durability of its non-stick properties compared to a ceramic coating (composition) in the absence of diamonds. The ECC composition for an ECC with durable non-stick properties as envisaged herein comprises a ceramic coating composition (CCC) and a diamond additive. The ECC composition is typically applied to an artefact as a further non-stick layer (e.g. a top coat), over a base coat of non-stick coating. When the diamond additive is added to the upper layer or top coat layer of e.g. a cookware item, the diamonds are present where they are the most useful (i.e. in the layer which is in contact with the food) The ECC as taught herein may be decorative, functional, or both. The ECC as envisaged herein has an improved durability of the coating's non-stick property, or stated differently, the non-stick property of the coating lasts longer, when compared to the non-diamond additive coating derived from the CCC.

The ECC composition as envisaged herein, and which forms an enhanced ceramic coating (ECC) when applied on an artefact, comprises a ceramic coating composition (CCC) and between 0.1 wt % and 2 wt % diamond additive (DA), preferably between 0.1 wt % and 1 wt % DA, with the wt % being relative to the total weight of the ECC composition, wherein the durability of the non-stick property of said enhanced ceramic coating is at least 20% longer, preferably at least 30% or 40%, more preferably at least 50% or 60% longer than the durability of the non-stick property of the ceramic coating CCC in the absence of diamonds, or stated differently, wherein the ECC has a non-stick durability of at least 17, preferably, 18, 19, or 20 cycles, with preferably each cycle comprising in sequence an ENV 12875-1:1998 Dishwasher test, a first temperature shock treatment (260° C. for 10 min, followed by a quenching step) and a second temperature shock treatment (260° C. for 10 min, followed by a quenching step), and wherein the non-stick property and non-stick durability is assessed as described herein.

As envisaged herein, the non-stick property or non-stick release performance of a coating, particularly ceramic coating, may be assessed by performing the Cookware Manufacturers Association (CMA) Standard Fried Egg test (CMA Standards Manual (2012), p. 81), which is an adaptation of British Standard (BS) 7069:1988, wherein the egg release is graded as follows:

Grade 5—Excellent non-stick properties: No sticking in center or edges of egg. Slides easily without pushing with spatula. Leaves no mark or residue.

Grade 4—Good non-stick properties: Slight sticking around edges. Slides easily if moved with spatula. Leaves slight mark, but no residue.

Grade 3—Fair non-stick properties: Moderate sticking on edges, slight sticking in center. Slides only if steeply tilted and shaken, and must be pushed with spatula. Leaves mark and slight residue.

Grade 2—Poor non-stick properties: Requires considerable effort to free egg, but can be freed intact with spatula. Does not slide. Leaves moderate residue.

Grade 1—Very Poor non-stick properties: Egg cannot be freed from surface without breaking up.

Non-stick ceramic coatings based on a ceramic coating composition as envisaged herein typically have a perfect non-stick performance when new, obtaining a Grade 5 score in the Fried egg test (i.e. perfect release: no egg residues remain on the surface after the egg is released).

As envisaged herein, the durability of the non-stick property of a coating may be measured by determining the number of one ENV12785-1:1998 Standard Dishwasher test+two temperature shock (260° C.; 10 min, followed by quenching) cycles required to reduce the non-stick property of the coating from Grade 5 to Grade 1, wherein the non-stick property of the coating before and after each cycle is evaluated by performing a Standard CMA Fried Egg test. Advantageously, this analysis method simulates the domestic use. More in particular, the evaluation of the non-stick durability comprises the following steps:

(i) Assess the initial non-stick property or non-stick release performance of the coating (applied on a cookware item) via a Standard CMA Fried Egg Test (5 times) on a scale of Grade 5 (perfect non-stick) to Grade 1 (egg sticks). It is understood the coating should not have any surface defects before the test;

(ii) Perform an ENV12875-1:1998 Standard Dishwasher Test, to remove egg residue;

(iii) Subject the coating to a Temperature Shock (260° C. for 10 mins, then quench) and repeat the Temperature Shock treatment (i.e. 2 temperature shock treatments). The temperature shock treatment includes heating up the interior base center (of the artefact) to a temperature of 260° C. and maintaining that temperature for 10 minutes. Next, the sample is immediately quenched in tap water at ambient temperature;

(iv) Assess the non-stick property via CMA Standard Fried Egg Test (2 times);

(v) Repeat steps (ii) to (iv) until the non-stick property is reduced to Grade 1 (egg sticks). Comparing the non-stick durability of a ceramic coating composition (CCC) as envisaged herein with an ECC comprising diamonds allows assessing the increase in the durability of the non-stick property due to the addition of diamonds to the CCC.

Advantageously, the ECC as envisaged herein also exhibit an improved durability of the non-stick performance to salt water (boiling), which may be assessed by performing the CMA Fried Egg test after repeated three hours of 5% salt water boiling. The Salt Water Boiling followed by Fried Egg testing is repeated until the non-stick release grade becomes 1. The longevity of the non-stick properties are then expressed as the number of hours of salt water boiling required to destroy the non-stick properties. More in particular, the evaluation of the non-stick durability or non-stick release performance via the 5% Salt Water Boiling test comprises the following steps:

(i) Assess the initial non-stick property or non-stick release performance of the coating (applied on a cookware artefact) via a Standard CMA Fried Egg Test on a scale of Grade 5 (perfect non-stick) to Grade 1 (egg sticks);

(ii) Fill the cookware artefact with a 5% salt solution to a level more than half-way up the side wall of the artefact;

(iii) Keep the temperature of the solution at boiling for 3 hours;

(iv) Assess the non-stick property via CMA Standard Fried Egg Test (2 times);

(v) Repeat steps (ii) to (iv) until the non-stick property is reduced to Grade 1 (egg sticks). Advantageously, the ECC as envisaged herein also exhibit an improved durability of the non-stick performance to abrasion, which may be assessed by performing the CMA Standard Fried Egg test after a BS7069:1988 Abrasion test. In particular, the Abrasion-Fried Egg test comprises the following steps:

(i) Assess the initial non-stick property or non-stick release performance of the coating (applied on a cookware artefact) via a Standard CMA Fried Egg Test on a scale of Grade 5 (perfect non-stick) to Grade 1 (egg sticks);

(ii) perform an Abrasion Test on the coating applied on a cookware artefact using a 3M 7447B Scotch-Brite abrasive pad and a force of 1.5 kg (renew the abrasive pad every 250 cycles);

(iii) Assess the non-stick property via CMA Standard Fried Egg Test (2 times);

(iv) Repeat steps (ii) to (iii) until the non-stick property is reduced to Grade 1 (egg sticks).

In particular embodiments, the ECC composition contains more than 80 wt % CCC, preferably more than 90% CCC, more preferably more than 95% CCC, preferably up to 99.9 wt % CCC. Most preferably, the ECC may contain 98 to 99.9 wt % CCC. The ECC composition is provided as a liquid composition.

The term "coating composition" refers to a composition capable of forming a coating.

The terms "coating" and "coating layer" may be used interchangeably and refer to a covering that is applied to and bound to at least part of (the surface of) an object, usually referred to as the substrate. The terms "% by weight" or "wt %" refer to weight percent compared with (i.e. relative to) the total weight.

The ceramic coating composition (CCC) as envisaged herein may be any non-stick ceramic coating composition containing Si. It may be an inorganic ceramic coating composition or a hybrid ceramic coating composition. It may be a sol-gel ceramic coating composition. It may be a liquid or a gel.

The inorganic CCC may be any which is inorganic, and preferably containing silica, though it may be based on a different metal, such as zirconium (forming zirconia ceramic). Inorganic ceramic coatings are well known in the art and include temperature-resistive coatings, non-stick coatings, as well as the coatings described herein. The term "inorganic" refers to not composed of organic matter. Inorganic compounds are traditionally viewed as being synthesised by the agency of geological systems. In contrast, organic compounds are found in biological systems. Inorganic chemistry deals with molecules lacking carbon. Typically, a non-stick inorganic CCC contains a silane, or an oligomer thereof.

The term "hybrid ceramic coating (composition)" refers to ceramic coatings that are inorganic-organic. Such a coating contains oligomeric or polymeric chains containing both Si and C atoms. A hybrid CCC is known in the art of non-stick coating. A hybrid CCC typically contains silicone type resins (binders) with a relatively high ratio of Si (i.e. inorganic part of the chain) to organic material (i.e. organic part of the chain). Si-atoms may form a part of oligomer chain that comprises a Si atoms backbone with organic linkages between them. These chains may or may not be silanes. An example of a hybrid CCC is a polymer of tetraethoxysilane.

The chain of a hybrid CCC is generally pre-formed by a coating manufacturer. The synthetic chemistry (i.e. synthesis) with a hybrid CCC has generally already been performed by the coating manufacturer. The physical/mechanical properties of these hybrid coatings generally speaking may be somewhere between inorganic ceramic-like and organic-like—e.g. harder and more temperature resistant than a silicone polyester non-stick coating but less hard and less temperature resistant than an inorganic ceramic non-stick coating.

An example of a hybrid ceramic is the hybrid ceramic manufactured by Fruto Chemicals Company Ltd (China) which may be suitable for non-food applications, and which comprises ceramic-silicone resin (CAS no: 67763-03-5, 40-50 wt %); PMA/IPA solvent (CAS no: 108-65-6, 10-20 wt %); titanium dioxide (CAS no: 13463-67-7 20-30 wt %); carbon black (CAS no: 1333-86-4, 8 wt %); cobalt & FE dioxide (CAS no: 13463-67-7, 10-20 wt %); trimethylamine (CAS no: 121-44-8, 0.5-1 wt %); whisker filler (8-15 wt %); mica (CAS no: 12001-26-2, 0.2-1 wt %); surfactants (0.5 wt %).

The CCC as envisaged herein may be a sol-gel type. A sol-gel type of ceramic coating is known in the art, and typically it contains a mixture of binding agent comprising a silane or an oligomer thereof and silica. The sol-gel may be inorganic or hybrid.

Generally in a sol-gel, silane monomers oligomerise to form oligo-silanes during a maturing reaction, and subsequently, the oligo-silanes would bond to the oxides at the surfaces of the substrate and then further polymerise during a drying/curing step after application.

According to one embodiment of the invention, the CCC is a sol-gel CCC comprising:
(a) 11-20 wt % of a silane or an oligomer thereof as a binder;
(b) 19.5-41.5 wt % of a silica mixture;
(c) 0-19 wt % of a functional filler;
(d) 2-15 wt % a ceramic powder that emits far infrared radiation and anions; and
(e) 0-25 wt % pigment that produces colour;
with wt % compared with the total weight of the sol-gel CCC.

In a particularly advantageous embodiment, the sol-gel CCC as envisaged herein comprises:
(a) 11-20 wt % of a silane or an oligomer thereof as a binder;
(b) 19.5-41.5 wt % of a silica mixture;
(c) 3-19 wt % of a functional filler; such as 3-15 wt % or 10-19 wt % of a functional filler;
(d) 2-15 wt % a ceramic powder that emits far infrared radiation and anions; and
(e) 0-25 wt % pigment that produces colour;
with wt % compared with the total weight of the sol-gel CCC.

Preferably, the sol-gel CCC as envisaged herein comprises:
(a) 12-15.3 wt % of a silane or an oligomer thereof as a binder;
(b) 25-35 wt % of a silica mixture;
(c) 0-15 wt % of a functional filler, preferably 3-15 wt % of a functional filler;
(d) 2-5 wt % a ceramic powder that emits far infrared radiation and anions; and
(e) 5-20 wt % pigment that produces colour;
with wt % compared with the total weight of the sol-gel CCC.

Preferably, the sol-gel CCC as envisaged herein comprises:
(a) 12-15.3 wt % of a silane or an oligomer thereof as a binder;
(b) 25-30 wt % of a silica mixture;
(c) 3-6 wt % of a functional filler;
(d) 3-5 wt % a ceramic powder that emits far infrared radiation and anions; and
(e) 15-20 wt % pigment that produces colour;
with wt % compared with the total weight of the sol-gel CCC,
wherein, preferably, the binder is provided as 32-36 wt % methyltrimethoxysilane (MTMS) in ethanol.

The components of the sol-gel CCC as envisaged herein are preferably suspended in a solvent such as a mixture of water and an alcohol such as methanol, ethanol or isopropyl alcohol. The different components for use in the methods, compositions and coatings as envisaged herein are further discussed below:

The silane or an oligomer derived thereof as a binder may be a liquid. In certain embodiments, the silane or oligomer thereof as envisaged herein may be an alkoxysilane or an oligomer thereof. The silane or an oligomer derived thereof may be provided in alcohol; the % wt of silane or an oligomer still refers to the wt % of silane or an oligomer derived thereof present in the inorganic ceramic coating composition and not to the wt % of the alcohol solution thereof. The alcohol may be, for instance, methanol, ethanol, or isopropyl alcohol. The silane or oligomer derived thereof may be present in the alcohol at 20 wt %, 30 wt %, 40 wt %, 50 wt % compared with the total weight of the alcohol solution. It is appreciated that just prior to mixing with the other components of the CCC, the alcohol may contain water.

In certain embodiments, the silane may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane.

In certain embodiments, the silane or oligomer thereof may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane, or an oligomer thereof.

In certain embodiments, the silane or oligomer thereof may be methyltrimethoxysilane (MTMS) or an oligomer thereof. The silane or oligomer thereof may be 32-36 wt %, preferably as 34 wt % methyltrimethoxysilane (MTMS) in ethanol.

In certain embodiments, the silane may have a formula $R_n SiX_{4-n}$ or an oligomer thereof, wherein each X is the same or different, and is selected from a hydrolysable group or a hydroxyl group, R is the same or different, and is selected from hydrogen or an alkyl group having less than 10 carbon atoms, and n is 0, 1, or 2.

In certain embodiments, the hydrolysable groups may be an alkoxy moiety such as methoxy or ethoxy. Such methoxy or ethoxy groups advantageously react with the various forms of hydroxyl groups.

As used herein, the term "alkyl group" refers to a hydrocarbon group of Formula $C_p H_{2p+1}$ wherein p is a number of at least 1. Alkyl groups may be linear, or branched and may be substituted as indicated herein.

The alkyl groups may comprise from 1 to 10 carbon atoms, preferably from 1 to 6 carbon atoms, more preferably 1, 2, 3, 4, 5, 6 carbon atoms. When a subscript is used herein following a carbon atom, the subscript refers to the number of carbon atoms that the named group may contain. For example, the term "alkyl group having less than 10 carbon atoms", as a group or part of a group, refers to a hydrocarbon group of Formula $C_p H_{2p+1}$ wherein p is a number ranging from 1 to 10. For example, an alkyl group having less than 10 carbon atoms includes all linear, or branched alkyl groups having 1 to 10 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, and decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, henicosyl and its isomers, docosyl and its isomers, tricosyl and its isomers, tetracosyl and its isomers, pentacosyl and its isomers, and the like.

If the content of the binder is out of the above-specified range, delamination of a coating layer formed by the ECC composition as taught herein can occur.

In certain embodiments of the sol-gel CCC as envisaged herein, the silica mixture is bound to the silane or to the oligomer thereof by a chemical reaction. Typically it binds as the inorganic ceramic coating composition starts to mature.

The silica mixture chemically binds the silane or oligomer derived thereof as binding agent. In certain embodiments of the sol-gel CCC as envisaged herein, the silica mixture contains 20-40 wt % of silicon dioxide ($SiO_2$) as a powder or colloid. The remainder of the silica mixture may comprise water, optionally combined with an alcohol, such as methanol, ethanol or isopropyl alcohol. The $SiO_2$ preferably has a particle size of 0.2-1.0 μm. The $SiO_2$ preferably contains 60-80 wt % of water, with wt % compared with the total weight of the silica mixture. If the particle size and content of the silica mixture are out of the above-specified ranges, the silica mixture may not sufficiently react with the binder silane or oligomer thereof.

The sol-gel CCC as envisaged herein preferably contains a functional filler. The functional filler may be a powder. The functional filler as defined herein may be potassium titanate, alumina or the like. The functional filler as defined herein may be composed of needle-shaped or sheet-shaped particles. The mean particle size may be 5 μm, 10 μm, 20 μm, 25 μm, or a value in a range between any two of the aforementioned values, preferably between 5 μm and 20 μm, preferably equal to or less than 20 μm. The functional filler as defined herein functions to prevent cracking between the binder and the silica mixture in a coating layer formed of the inorganic ceramic coating composition as taught herein and/or to control the viscosity of the inorganic ceramic coating composition as taught herein. If the content of the functional filler as defined herein is more than 19 wt %, the surface of the coating layer will become rough.

In certain embodiments, the functional filler as envisaged herein may comprise at least one natural mineral material selected from the group consisting of quartz, monzonite, gneiss and rhyolitic tuff.

The sol-gel CCC as envisaged herein comprises ceramic powder emitting far infrared radiation and anions. The mean particle size of the ceramic powder may be 2 μm, 4 μm, 6 μm, 8 μm, or 10 μm, or a value in a range between any two of the aforementioned values, preferably equal to or less than 10 μm.

The ceramic powder emits far-infrared (IR) radiation together with anions. The ceramic powder may comprise a material that emits both far IR rays and anions, or a mixture of materials that separately emit far IR radiation and anions. In particular embodiments of the sol-gel CCC, the ceramic powder comprises a far infrared radiation emitting material and an anion-emitting material.

The far-infrared radiation-emitting material may be a ceramic material comprising at least one selected from a group of natural mineral materials (tourmaline, loess, sericite, amethyst, raw ore, bamboo charcoal, Uiwangseok (natural ore), obsidian and elvan) which show a far-infrared emissivity of 90% or higher at a temperature of 40° C. The anion emitting material may comprise at least one element selected from the group of strontium, vanadium, zirconium, cerium, neodymium, lanthanum, barium, rubidium, cesium and gallium. In certain embodiments of the CCC as taught herein, the far-infrared radiation emitting material and the anion-emitting material may be mixed at a weight ratio of 1:1.

The far-infrared radiation-emitting material as defined herein may be any ceramic material which shows a far-infrared emission rate of 90% or higher, at a temperature of 40° C. Far-infrared emissions have a wavelength of 15 µm to 1 mm. Far-infrared emissions may be tested using KICM-FIR-1005 (based on JIS-R-1801) by using FT-IR.

In certain embodiments, the far-infrared radiation emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, and lava. It is noted that most natural ceramic mineral materials also emit anions.

The anion-emitting material as defined herein may be any material which emits an anion. The presence of anion emissions may be tested using JIS-B-9929.

In certain embodiments, the anion-emitting material may be an element. The element comprises at least one element selected from the group consisting of strontium, vanadium, zirconium, cerium, neodymium, lanthanum, barium, rubidium, cesium, and gallium. Such anion-emitting materials are known to emit anions and far-infrared rays.

The far-infrared radiation-emitting material and the anion-emitting material may be mixed at a weight ratio of 1:1, wherein the far-infrared radiation-emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, Kwisinsuk and lava; and the anion-emitting material may comprise at least one element selected from the group consisting of strontium, vanadium, zirconium, cerium, neodymium, lanthanum, barium, rubidium, cesium, and gallium.

The pigment that produces colour may be any pigment used in the field of ceramic coatings such as, for instance, iron (III) oxide. Where the present composition is used as a base coat, the pigments might include for example Titanium Dioxide (CAS No 13463-67-7) and/or Copper Chromite Black Spinel (CAS No 68186-91-4) or other inorganic pigments that contain no toxic heavy metals.

The ECC or ECC composition as envisaged herein comprises 0.1% to 2% wt of a diamond additive (DA), preferably 0.1% to 1% wt DA, with the wt % being relative to the total weight of the ECC composition. The DA as envisaged herein comprises diamond, preferably single crystal diamonds, and optionally mica. The DA is preferably added to the CCC as a dry powder. However, it may be added as a suspension of the powder dispersed in one or more solvents present. The one or more solvents may be one or more of those present in the ECC.

The diamond is present in the DA as particles, particularly as single crystals. The diamond particles may have a size range of 4 µm to 8 µm as measured using standard techniques and, for instance, a particle size analyser. Preferably, the diamond particles have a particle dispersity (Polydispersity Index or PDI) below 0.3. The diamond is industrial diamond. The diamond may be that suitable for regular food contact for cookware applications.

The mica is present in the DA as mica particles. The mica particles may have a size range of 5 µm to 30 µm as measured using standard techniques and, for instance, a particle size analyser.

The mica may be present as a mixture of one, or two or more types of mica. One mica could be for instance CAS 12001-26-2. The other type of mica where present can be any; it would be food contact compliant for cookware applications The mica can enhance the visual appearance of the artefact by providing a metallic glitter effect. The mica is suitable for regular food contact for cookware applications.

The weight ratio of diamond:mica in the DA is between 1:0 and 1:3, preferably between 1:2 and 1:3, most preferably between 1:2.5 and 1:3.

There may be at least 20 wt % diamond in the DA, more preferably 25 wt %-30 wt %. Accordingly, the ECC composition as envisaged herein comprises between 0.02 and 0.65 wt % diamond particles, preferably between 0.1 and 0.5 wt % diamond particles, such as between 0.1 and 0.4 wt % diamond particles, with the wt % being relative to the total weight of the ECC composition.

A base coating may be used in combination with other coatings such as intermediate and top coating. The base coating is disposed closest to the artefact substrate surface.

The base coating may be ceramic coating. The base coating preferably does not contain the DA. In one embodiment, the base coating may be an ECC described herein. Alternatively, the base coating may be a CCC described herein i.e. devoid of DA. The base coating may contain pigment that produces colour and opacity for covering the underlying substrate.

The base coating may be specifically formulated to be compatible with the ECC top coat and its DA which is within the activities of the skilled person.

The artefact, in particular the cookware item may be coated with at least one layer of the ECC composition as taught herein. The artefact, in particular the cookware item, may be coated with multiple layers of the ECC composition as taught herein. For example, the artefact, in particular the cookware item, may be coated with two or more, three or more, or four or more layers of the ECC composition as taught herein.

The ECC composition as taught herein may be applied as a base, top, or intermediate coating for the artefact. Preferably, it is provided as a top coating over a base coating.

In a preferred embodiment, the artefact is provided with a dry (cured) film comprising one base coating and one ECC over the base coating. In a preferred embodiment, the artefact is provided with a dry film comprising one base coating (which can also be ECC) and one ECC applied over the base coating, wherein the ECC coating is 14-50 wt %, preferably 25-35 wt %, more preferably around 30 wt % of the total cured coating.

In a preferred embodiment, the artefact with a dry film comprising one base coating (which may be an ECC as described herein) and one ECC coating applied over the base coating wherein the ECC coating is 4-50%, preferably 25-35%, more preferably around 30% of the height of the total cured coating. The ECC top coat may provide a clear or translucent layer, whereas the base coating may provide colour and opacity for covering the underlying substrate.

In certain embodiments, the present invention relates to an ECC applied to and bound to (the surface of) an artefact, wherein the ECC is prepared from the ECC composition as taught herein, typically by a curing step.

The artefact may be any article that is amendable to receiving a ceramic coating. In particular, the artefact is anything where providing a non-stick property on at least part thereof is advantageous. The artefact may be cookware or bakeware for the oven or stove-top. For instance, the artefact may be a frying pan, a skillet, a sauce pan, a crepe pan, an egg pan, a milk pan, a casserole dish, a stock pot and the like. For instance, the artefact may be a cake tins, a muffin tin, a bread tin, a pizza tray, a roasting tin, a Dutch Oven and the like. The artefact may be an electrical appliance such as a barbeque grill, a multi-cooker, an electric pressure cooker, a rice cooker, a waffle maker, a sandwich toaster, a hair care product such as a hair straightener or a curling iron, and the like. Equally, the artefact may be anything where a non-stick property is not a requirement, such as in a wood-burning-stove, heating boiler, heater in general. The artefact may be provided in a health aid (e.g. implant, surgical tool), building material or industrial products.

Where the coating of an artefact is described herein, it is understood that at least part of the artefact is coated. It does not mean that the whole artefact is coated, however, it may be an-over coating or may only cover parts of the artefact. For instance, the ECC composition may be applied to the interior surface, the exterior surface, and/or the handle of the cookware. Generally speaking, it is understood that the artefact is provided with a substrate onto which the ECC or ECC composition is disposed. For instance, where the artefact is a hair straightener, the substrate is typically a pair of electrically-heated aluminium co-operating surfaces. The substrate of the artefact may be any amendable to receiving the ECC or ECC composition, and may be metallic or polymeric.

The substrate may be aluminium (i.e. metallic or alloy), hard anodized aluminium, stainless steel, copper, cast iron, enameled cast iron, carbon steel, enameled carbon steel, or any other metal that is used in an artefact. The substrate may be polymeric, such as a high-temperature resistance polymer.

Some parameters of the dry (cured) coating or film as envisaged herein are detailed below:

The thickness of the dry (cured) film provided on an artefact and containing the ECC is suited to its application. The thickness of the dry film containing the ECC and any other coatings (e.g. base coating) may be 20-60 µm. The thickness of the ECC component in the dry film provided on an artefact may be 5-50µ, preferably 5-20 µm.

Other parameters characterising the dry (cured) film containing the ECC as a top coat include one or more of the following:
Cross Hatch Adhesion (CMA 21.6.1/BS7069)—Pass (No Coating Removed);
Pencil Hardness (EN 12983-1:1999) greater than 9H, preferably greater than or equal to 10H at room temperature and at 200 deg C. (Pencil Hardness of 9H translates into a value of >1 GPa (Giga Pascal) or >100 Vickers.
Elastic Modulus of 8-10 GPa;
Scratch Resistance of 10 to 15 N (by BS7069);
Abrasion Resistance of 20,000 to 90,000 cycles with a 45 N (BS7069 adapted to employ a 45 N force instead of the specified 15 N);
Water Contact Angle of 105 deg to 108 deg measured according to the Cookware Manufacturers Association Standards Manual (2012) p 76-77;
Thermal Conductivity of 2.2 to 2.7 $W \cdot m^{-1} K^{-1}$, preferably 2.4 to 2.6 $W \cdot m^{-1} K^{-1}$ measured according to ASTM E-1461;
Far Infrared Emissivity, epsilon of 0.92 to 0.93 measured according to KICM-FIR-1005:2006;
Dry Film Density of 2.0 $g/cm^3$ (typical for top coat) to 2.5 $g/cm^3$ (typical for base coat)—naturally, the combined base and top coat will have an average density somewhere between these two numbers;
Dry Film Elemental Composition, measured by SEM-EDX typically of Carbon (C) (13-14 wt %), Oxygen (O) (37-38 wt %), Silicon (Si) (32-33 wt %), Titanium (Ti) (3.9-4.0 wt %), Aluminium (Al) (4.4-4.5 wt %).

The ECC composition as taught herein may be applied by using various coating methods known in the art such as spray coating, roller coating, curtain coating or dip coating.

Accordingly, in another aspect, the present invention relates to a method for coating an artefact, in particular an item of cookware with an ECC as taught herein.

The artefact substrate may be coated by a method comprising the steps:
pre-treating the artefact substrate by washing/degreasing,
roughening the surface of the artefact by sand or grit blasting or etching (acid or alkali),
applying the ECC composition as a base coating or as a subsequent coating, preferably by using a spray gun or an air-assisted spray gun,
curing the coating(s).

Spraying the ECC composition as taught herein may be performed manually or automatically.

A further embodiment of the invention is a method for coating an artefact substrate surface comprising the steps:
A) roughening of the surface of the substrate,
B) applying a base coat of ceramic coating composition to the substrate,
C) applying a top coat of ECC composition as described herein over the wet base coat, and
D) curing the combined base coat and top coat to obtain a dry film.

The base coating may be an ECC as described herein, or any another ceramic coating composition.

Where the ECC is applied as a subsequent coating, for instance, over a base coating, it may be applied over the wet base coat. The curing step is applied to both the base coating and the ECC.

Where the CCC as envisaged herein is a sol-gel coating, the present invention provides a method for coating an artefact comprising the steps of:
providing a first solution comprising a silica mixture, a functional filler, a ceramic powder that emits far-infrared ray-radiation and anions in a first container;
providing a second solution comprising silane or an oligomer thereof as a binder in a second container;
pre-agitating the first solution in the first container and the second solution in the second container;
mixing the first solution and the second solution, thereby obtaining the CCC as taught herein;
agitating the CCC as taught herein;
maturing the CCC as taught herein;
adding the DA to the CCC thereby obtaining the ECC composition as taught herein;
filtering the ECC composition;
applying the ECC composition onto the artefact as a base coating or a further coating, preferably as a top coating; and
curing the ECC, thereby obtaining an artefact coated with a film containing the ECC.

The term "maturing", as used herein, refers to bringing the chemical reactions (e.g. acid catalysed silane oligomer formation, reaction between the silica mixture and the silane or oligomer derived thereof) in the CCC to completion.

The term "curing", as used herein, refers to heating the ECC applied to the artefact, to solidify the ECC and bind it to the artefact. After curing, the adhesion of the ECC as taught herein to the artefact surface, for instance a cookware, is mainly mechanical although there may be some chemical bonding involved.

The quantities of components in the first and second solution are such that the first and second solutions when mixed form the CCC as described herein. The quantities of DA added to the CCC are such that the CCC and DA when mixed form the ECC composition as described herein.

An acid (e.g. hydrochloric acid; formic acid; sulfuric acid; acetic acid; nitric acid), in a catalytic amount (less than 1 wt % of the CCC) may be additionally provided in the first and/or second solutions or added separately.

The ECC composition may be provided as a first solution comprising a silica mixture, a functional filler, a ceramic powder that emits far-infrared ray-radiation and anions; a second solution comprising a silane or an oligomer thereof as a binder; and DA comprising diamond particles and optionally mica.

Prior to the step of pre-agitating the first solution and the second solution, the coating method as envisaged herein may comprise checking whether any deposits adhere to the base of the container comprising the first solution and/or the container comprising the second solution. Any such deposits may be broken down and evenly suspended in the solution before mixing.

If deposits adhere to the inside of the container, the base may be tapped with a rubber or wooden mallet and then the container shaken vigorously. This may be repeated until the deposits are fully dispersed and are no longer visible.

The step of pre-agitating the first solution and the second solution may be performed by rolling the first and second solutions in separate containers on a roller for at least 60 min. The rolling may be performed at a speed of 80-100 rpm (relative to the circumference of the container) and temperature of 20-30° C. The step of pre-agitating may equally be performed using a stirrer.

The step of mixing the first solution and the second solution may be performed by adding the second solution to the first solution. The ECC composition as taught herein may contain 30-50 wt % (e.g. 35 wt %) of the second solution, 70-50 wt % (e.g. 65 wt %) of the first solution, and 0.5-2 wt % DA depending on the concentration of components in the respective solutions.

The step of agitating the CCC composition as taught herein should be performed immediately after mixing the first solution and the second solution; the agitation is generally vigorous shaking. The step of maturing the CCC as taught herein may be performed without any delay after the step of agitating the CCC as taught herein. This allows obtaining a high quality coating.

There may be some variations in the maturing conditions (e.g. maturing time and temperature of mixing).

The step of maturing the CCC as taught herein may be performed by agitating the CCC, for instance by rolling the CCC at a speed of 80-100 rpm (relative to the circumference of the container), at an air temperature of 40±2° C. Ultrasonic mixing may also be used in conjunction with agitation to augment the mixing efficiency and thus promote the maturation reaction.

Maturing times may be about 3 hours but may vary according to the conditions such as temperature in the working environment.

Alternatively, the step of maturing the CCC as taught herein may be performed by agitating the CCC, for instance by rolling the CCC as taught herein for 24 hours at room temperature.

The step of maturing the CCC as taught herein may be checked by a maturity check. For instance, to check whether the CCC is sufficiently matured, the coating may be sprayed onto a plate, for example a sandblasted aluminium plate, and then baked, for example for 10 minutes at 60-80° C. Good appearance and gloss levels (i.e. when compared with a control standard) may indicate that maturing is complete. Alternatively, if craters are seen in the coating, or there appears to be insufficient gloss, maturing may not be sufficient. If the coating is found to be under-matured (i.e. low gloss and/or craters) then the container with the CCC as taught herein may need to be returned to the rollers for a further period of 30 minutes at a speed of 80-100 rpm.

The step of adding the DA to the CCC is performed as oligomerisation (maturing) is essentially complete. The DA may be added to the CCC between 1.5 to 2.5 hours after initiation of maturing, preferably after 2 hours after initiation of maturing. After adding the DA to the CCC the mixture may be agitated to facilitate mixing, for instance, by rolling. Ultrasonic mixing may also be used in conjunction with agitation to augment the mixing efficiency and thus promote the maturation reaction.

The step of filtering the ECC composition as taught herein is important to prevent clogging of the spray gun(s) and for a smooth finish. The step of filtering the ECC composition as taught herein may be performed with a filter mesh size of 300 to 400.

The step of spraying the ECC composition as taught herein may be performed by using a spray gun such as an air-assisted spray gun. The nozzle diameter may be 1.0 to 1.3 mm. The air pressure may be 2 to 6 bar, depending on the spray gun type. The artefact surface temperature may be 45±10° C., as measured by using a contact thermometer.

The step of spraying the ECC composition as taught herein may be performed in a coating booth, preferably at a temperature of 20-30° C. and with a relative humidity of less than 70%. In certain embodiments, spraying may be performed manually, semi-automatically or automatically.

As mentioned earlier, adhesion to the artefact substrate surface, preferably metal surface, may be promoted by grit-blasting the surface, preferably a metal surface, to create a rough profile of peaks and troughs (i.e., an anchor pattern). The momentum of the atomised coating from the spray gun(s) creates flow at the surface, preferably metal surface, thus causing coating to flow into the rough profile.

The artefact substrate surface may be pre-treated before applying the ECC or before applying any base coating. Pre-treatment of the artefact substrate surface before applying a coating may involve de-greasing the artefact substrate surface, preferably by solvent, alkali wash. Optionally degreasing includes a step of high temperature exposure to burn off organic material. Such a step may be performed prior to or after a roughening step, but preferably before.

Pre-treatment of the artefact substrate surface before the coating step may involve a roughening step. Roughening of the surface may be achieved by sand or grit blasting or etching (acid or alkali). Where sand blasting is used, alumina shot, for example, may be employed. The particle size may be 60 to 80 mesh. The blasting pressure may be 5 to 7 bar. The depth of blast layer (Ra value) may be 2.5 to 3.5 µm (for an aluminum substrate), or 2.5 to 3.0 µm (for an SUS stainless steel artefact surface).

Pre-treatment of the artefact substrate surface before the coating step may involve cleaning the artefact surface for instance by blasting with clean/dry air, preferably at a pressure of 5 to 7 bar, to remove dust and particles.

Pre-treatment of the artefact substrate surface before the coating step may optionally involve hard anodization of the artefact surface.

Pre-treatment of the artefact substrate surface before the coating step may involve dehumidifying of the artefact surface, for instance by pre-heating to peak temperature 60-70° C. immediately prior to spraying.

The step of curing the ECC as taught herein may be performed at a temperature of at least 180° C. The step of curing the ECC as taught herein may be performed at a temperature of 280-320° C. for 7 to 10 min. Longer curing times and/or higher temperatures allow a denser coating layer to be achieved. During curing, a fuller or complete polymeric structure is formed.

In certain embodiments, once the ECC composition as taught herein has been applied to the artefact, the ECC is cured, for instance at a peak metal part temperature, e.g. around 300° C. This causes the ECC to solidify and be locked into the anchor pattern. In other words, the adhesion of the ECC as taught herein to the artefact substrate surface, for instance a cookware, is mainly mechanical although there may be some weak chemical bonding of the silicon atoms (in the silane or oligomer thereof) to the artefact surface, for instance to the metal oxide layer of the artefact surface.

A further aspect relates to a kit for preparing an ECC as taught herein comprising: (a) a first solution comprising a silica mixture, a functional filler, a ceramic powder that emits far-infrared ray-radiation and anions, in a first container; (b) a second solution comprising a silane or an oligomer thereof as a binder; (c) DA provided in a third container. The first and second solutions, when mixed, provide the CCC. The DA when added to the CCC, provides the ECC containing DA in a quantity of 0.5 to 2 wt %.

In certain embodiments, acid catalyst may be added in catalytic amounts to the first and/or second solution of the kit, or may be provided as a catalytic solution. The acid catalyst catalyses oligomerisation of the silane. The amount of catalytic acid present in first and/or second solution, or optional catalytic solution of the kit is such that it is less than 1 wt % in the CCC i.e. when the solutions are mixed, wt % is compared with the total weight of the CCC.

A further aspect of the present invention relates to a method for improving the non-stick durability of a ceramic coating comprising adding 0.2 wt %-2 wt % diamond additive to a ceramic coating composition (CCC), thus obtaining an ECC composition, with wt % compared to the total weight of the ECC composition. In particular embodiments, said ceramic coating composition (CCC) is a sol-gel CCC as described herein. In particular embodiments, said diamond additive comprises diamond particles and mica particles in a weight ratio diamond particles:mica particles between 1:0 and 1:3, preferably between 1:2 and 1:3.

A further aspect relates to the use of the ECC composition as taught herein for coating an artefact, in particular an item of cookware.

A further aspect relates to an artefact, in particular an item of cookware, coated with the ECC as taught herein. The artefact may be disposed with a dry (cured) film containing the ECC as a top coat.

The terms "cookware" may be used interchangeably herein and refer to a kitchen utensil made of material used for cooking. Preferably, the cookware item is a cooking vessel.

The term "cooking vessel" refers to any food preparation vessel made of a heat-resistant material. In certain embodiments, the cookware, in particular the cooking vessel, may be a pan such as a frying pan. In certain embodiments, the cookware, in particular the cooking vessel, may be a pot.

In certain embodiments, the cookware item may be overall coated with the ECC as taught herein, i.e., the ECC as taught herein may completely cover the cookware item. In certain embodiments, parts of the cookware item may be coated with the ECC as taught herein. In certain embodiments, the interior surface, the exterior surface, and/or the handle and/or lid of the cookware item may be coated with the ECC as taught herein.

In certain embodiments, the interior surface of the cookware item may be coated with the ECC as taught herein. In certain embodiments, the interior surface and the exterior surface of the cookware item may be coated with the ECC as taught herein. In certain embodiments, the interior surface, the exterior surface, and the handle of the cookware item may be coated with the ECC as taught herein. In certain embodiments, the interior surface and the handle of the cookware item may be coated with the ECC as taught herein.

In certain embodiments, the artefact, in particular the cookware item may comprise the ECC as taught herein and an additional coating. For instance, the artefact, in particular the cookware item may be coated with a non-stick coating. In certain embodiments, the artefact, in particular the cookware item may be coated with an inorganic ceramic coating. For instance, the artefact, in particular the cookware item may be coated with a non-stick inorganic ceramic coating.

In certain a embodiment, the artefact, in particular the cookware item may be coated with one layer of the ECC coating as taught herein. In certain embodiment, the artefact, in particular the cookware item may be coated with multiple layers of the ECC as taught herein. For example, the artefact, in particular the cookware item may be coated with two or more, three or more, or four or more layers of the ECC as taught herein.

The present invention is further illustrated by the following non-limiting examples.

EXAMPLES

Example 1

An aluminium substrate surface of an artefact is roughened by sandblasting to increase the surface area to which aluminium oxide to be subsequently deposited is firmly adhered. After roughening, a washing and drying step is carried out to remove contaminants due to sand blasting. After said washing and drying step, an anodisation step is carried out to form a protective aluminium oxide film layer having enhanced anti-corrosive and anti-abrasive properties. After anodisation, a step of applying the enhanced ceramic coating ECC composition is carried out. The ECC composition comprises a mixture of ceramic coating composition (CCC) and diamond additive (DA).

The CCC comprises in admix 40-50 wt % of a binding agent, which is 34 wt % silane or an oligomer derived therefrom in ethanol, as a binder; 27-34 wt % of a silica mixture which chemically binds said silane or an oligomer derived therefrom as a binding agent and contains a mixture of 20-40 wt % of powdered silicon oxide having the particle size of 0.1-1.2 m and 60-80 wt % of water; 3-19 or 0-19 wt % of powdered functional filler which prevents the crack of a film between said binding agent and said silicon mixture and controls the viscosity such that the physico-chemical properties of the film are improved, said filler being comprised of one or more of natural stone material selected from the group consisting of quartz, monzonite, gneiss and rhyolitic tuff; 5-15 wt % of ceramic powder that emits far infrared ray-emitting and anions. The far infrared ray-emitting material comprises one or more selected from a group of natural mineral materials such as tourmaline, yellow ocher, sericite, amethyst, Sanggwangsuk, bamboo charcoal, Uiwangsuk, kiyoseki, obsidian, elvan, Kwangmyeongsuk, lava, Kwisinsuk, and said anion-emitting material is one rare-earth natural stone material selected from strontium, vanadium, zirconium, cerium, neodymium, lanthanum, barium, rubidium, cesium and gallium; 1-25 wt % of pigment which produces colour. The wt % is in relation to the total weight of CCC. The mixture is allowed to mature for 2 hours, after which diamond additive is added 0.2 wt %-2 wt % to form the ECC composition, the wt % is in relation to the total weight of ECC composition. After said step of applying the ECC composition is completed, a step of drying at 280-320° C. for 7-10 minutes is carried out to form a dry film coated onto the artefact. The coated artefact has the combined advantages of durable non-stick, scratch resistance and abrasion resistance.

Example 2

A stainless steel substrate surface of an artefact is roughened by sandblasting to increase the surface area for the application of further layers. After roughening, a washing and drying step is carried out to remove contaminants due to sand blasting. After said washing and drying step, a step of applying the enhanced ceramic coating ECC composition is carried out. The ECC composition comprises a mixture of ceramic coating composition (CCC) and diamond additive (DA) as described in Example 1. After said step of applying the ECC composition is completed, a step of drying at 280-320° C. for 7-10 minutes is carried out to form a dry film coated onto the artefact. The coated artefact has the combined advantages of non-stick, scratch resistance and abrasion resistance.

Example 3

Figure 2:
FIG. 2 shows the underside of the pans of FIG. 1.
Figure 3:
FIG. 3 is a photograph of the top side of two round sauce pans of different sizes coated according to the invention.
Figure 4:
FIG. 4 shows the underside of the pans of FIG. 3.
Figure 5:
FIGS. 5 and 6 show the topside of two square frying pans of the same size coated according to the invention.
Figure 6:
Figure 7:
FIG. 7 shows the underside of the pans of FIGS. 5 and 6.
Figure 8:
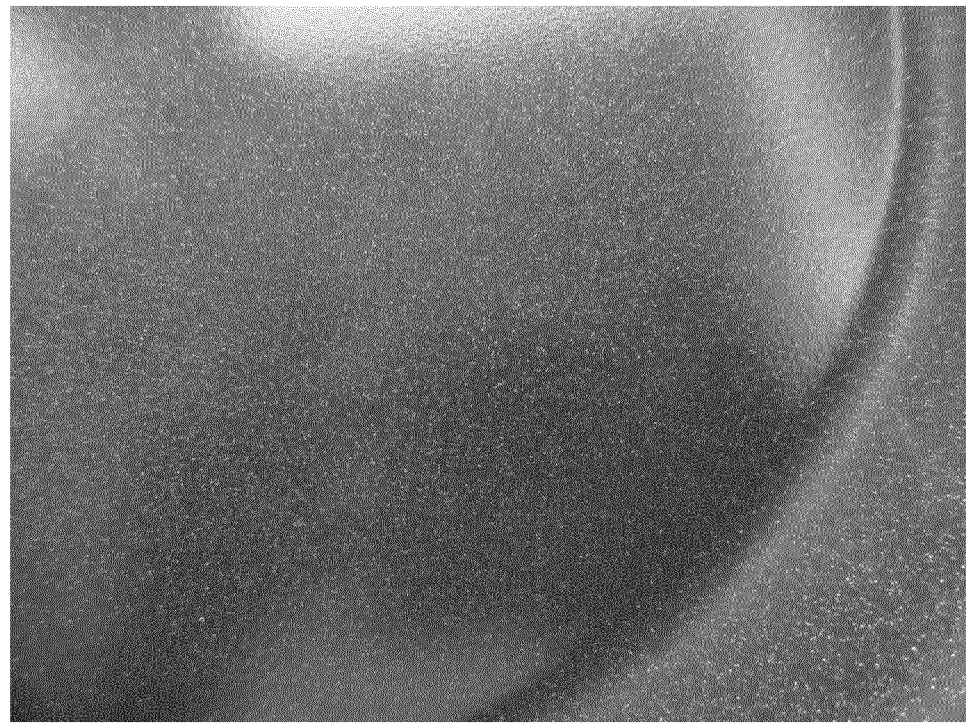
FIG. 8 is a detailed view of the interior of a pan coated according to the invention and the reflective speckling.

Illustrations of cookware, namely pans that have been prepared according to the invention are given in FIGS. 1 to 8. FIG. 1 shows the topside of two round frying pans of different diameters; FIG. 2 shows their underside, namely the respective bases. FIG. 3 shows the top side of two round sauce pans of different sizes each provided with a fitting lid; FIG. 4 shows their underside, namely the respective bases. FIGS. 5 and 6 shows the topside of two square frying pans of the same size; FIG. 7 shows their underside, namely the respective bases. FIG. 8 is a detailed view of the interior of a pan and the reflective speckling.

Example 4

Based on the total weight of CCC, 42.5 wt % of a solution containing 34% wt methyltrimethoxysilane (MTMS) as a binder in ethanol; 25.5 wt % of a silica mixture consisting of 40 wt % of silicon dioxide powder (SiO2) having a particle size of 0.2 μm and 60 wt % of water; 4.25 wt % of quartz as a functional filler; 4.25 wt % of ceramic powder consisting of a 1:1 mixture of the far-infrared ray-radiating material tourmaline and the anion-emitting material vanadium; and 15% black pigment that is copper chromite black spinel, the balance containing ethanol are mixed with each other and matured, thereby preparing Sample 1 (CCC).

To prepare a coating (ECC) of the invention, DA (diamond:mica weight ratio 1:2.5) to 1 wt % total weight ECC is added to a portion of Sample 1 two hours after initiation of maturing of Sample 1, thereby obtaining Sample 2.

Samples 1 and 2 respectively are coated as a top coat onto separate samples of artefact (Aluminium alloy 3003) and cured. The samples are tested for:

abrasion resistance measured according to (using a force of 45 N);

scratch resistance measured according to BS7069;

water contact angle measured according to the Cookware Manufacturers Association (CMA) Standards Manual (2012) p 76-77;

non-stick durability (in house test designed to simulate domestic use—based on the CMA fried egg test performed before and after a standard dishwasher and two temperature shock (referred to as 1DW+2TS) cycles as described above);

thermal conductivity measured according to ASTM E-1461; and pencil hardness measured according to EN 12983-1:1999.

The ranges of the results are presented in Table 1 below.

TABLE 1

Ranges of results for a coating of invention and a coating without DA.

| Property | Sample 1 Coating without DA (Comparative ex.) | Sample 2 Coating with DA |
|---|---|---|
| Abrasion Resistance (BS7069; 45 N force) | 12,000-20,000 cycles | 20,000-90,000 cycles |
| Scratch Resistance (BS7069) | 8 N | 13 N |
| Water Contact Angle (CMA Standards Manual (2012) p76-77) | 102-106° | 105-108° |
| Non-stick Durability (in house test - 1DW + 2TS) | | At least 40%-50% increase |
| Thermal Conductivity ($W \cdot m^{-1} K^{-1}$) | 2.0-2.4 | 2.4-2.6 |
| Pencil Hardness (EN 12983-1:1999) at room temperature and at 200 deg C. | ≥9H | ≥10 H |

The Sample 2 of the invention shows improvements in abrasion resistance, scratch resistance, water contact angle, non-stick durability, thermal conductivity and pencil hardness.

Example 5

Coatings based on an ECC composition as in Example 1 ("ECC (I)" and "ECC (II)") (based on a Thermolon™ CCC) were compared to Thermolon™ non-stick ceramic coatings, particularly the Thermolon™ Marathon and Endurance2 coatings ("Marathon" and "Endurance2", respectively), and an average non-stick ceramic coating ("average NS") available on the market today.

The non-stick durability was assessed by (i) the DW+2T test (as in Example 4), (ii) the 5% NaCl boiling test (i.e. based on hours boiling with 5% NaCl followed by the CMA Fried Egg Test) and (iii) the Abrasion Fried Egg test (i.e. performing the CMA Fried Egg Test after the BS7069 Abrasion—15 Nf). Other parameters were determined as in Example 4. The results are presented in Table 2.

TABLE 2

| parameter | Coating | | | | Average NS |
|---|---|---|---|---|---|
| | ECC (I) | ECC (II) | Marathon | Endurance2 | |
| DFT (μm) | 35 +/− 5 | 30 +/− 5 | 32 +/− 5 | 30 +/− 5 | |
| Pencil Hardness (H) | 10 | 10 | 9 | 9 | 9 |
| BS Abrasion Resistance | 32000 | 275000 | 40000 | 32500 | 12000 |
| Initial Fried Egg | 5 | 5 | 5 | 5 | 5 |
| DW + 2TS (cycle) | 24 | 22 | 15 | 13 | 10 |
| 5% NaCl-Fried Egg | 15 | 9 | 6 | 6 | 3 |
| Abrasion NS | 1250 | 750 | 500 | 250 | 250 |

With DFT: Dry Film Thickness.

These results clearly indicate that the addition of a diamond additive to a particular non-stick ceramic coating has a synergistic effect on the durability of the non-stick properties of the coating. Indeed, even at low diamond levels of less than 1 wt %, the non-stick durability (expressed as the DW+2TS cycles) increased by at least 50% compared to prior art non-diamond containing ceramic non-stick coatings. For instance, when comparing ECC (II) and Endurance2 of similar DFT but without diamonds, the improvement of the non-stick durability is about 70%. Compared to the average non-stick ceramic coatings on the market, non-stick durability at least doubled for the ECC.

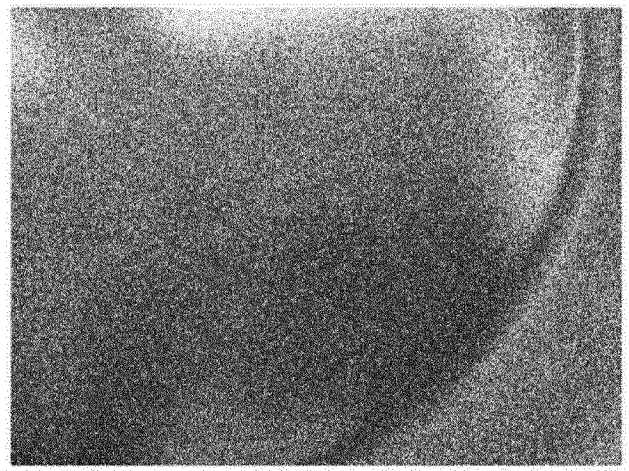

The invention claimed is:

1. An enhanced ceramic coating, ECC, composition for providing an enhanced non-stick ceramic coating on an artefact, the ECC composition comprising:
   a sol-gel type ceramic coating composition comprising a silane or an oligomer thereof, silica, a functional filler, and a ceramic powder that emits far infrared radiation and anions, and
   0.2 wt %-2 wt % of a diamond additive, with wt % compared with the total weight of the enhanced ceramic coating ECC composition,
wherein the ECC has a non-stick durability of a least 17 cycles, wherein the non-stick durability of a coating is measured by determining the number of cycles required to reduce the non-stick grade of the coating from 5 to 1, wherein the non-stick grade is determined by performing a Fried Egg Test according to the Cookware Manufacturers Association Standard before and after each cycle and wherein each cycle comprises in sequence an ENV12875-1:1998 standard Dishwasher test, a first temperature treatment of 260° C. for 10 min, quenching, and a second temperature treatment of 260° C. for 10 min.

2. The ECC composition according to claim 1, wherein the sol-gel type ceramic coating composition is present at more than 90 wt %, with wt % compared with the total weight of the ECC composition.

3. The ECC composition according to claim 1, wherein the diamond additive comprises diamond particles and mica particles in a weight ratio diamond particles:mica particles between 1:0 and 1:3.

4. The ECC composition according to claim 1, wherein the sol-gel type ceramic coating composition comprises:
   (a) 11-20 wt % of a silane or an oligomer thereof as a binder;
   (b) 19.5-41.5 wt % of a silica mixture;
   (c) 3-19 wt % of a functional filler; and
   (d) 2-15 wt % of a ceramic powder that emits far infrared radiation and anions;
and with wt % compared with the total weight of the non-stick sol-gel type ceramic coating composition.

5. The ECC composition according to claim 1, wherein said ceramic powder that emits far-infrared radiation and anions comprises a far-infrared radiation-emitting material and an anion-emitting element.

6. The ECC composition according to claim 5, wherein said far-infrared radiation-emitting material is a natural ore and wherein the far-infrared radiation-emitting material and the anion-emitting element are present in a 1:1 weight ratio.

7. A method for coating an artefact comprising applying an ECC composition according to claim 1 on the artefact.

8. An artefact provided with a non-stick dry film coating containing a ceramic coating prepared based on an ECC composition according to claim 1.

9. The artefact according to claim 8, wherein the total thickness of the dry film is 20-60 μm.

10. The artefact according to claim 8, wherein the non-stick dry film contains the ceramic coating based on an ECC composition as a top coat, and the dry film has a scratch resistance of 10 to 15 N as measured according to BS7069.

11. The artefact according to claim 8, wherein the non-stick dry film contains the ceramic coating based on an ECC composition as a top coat, and the dry film has an abrasion resistance of 20 000 to 90 000 cycles using a force of 45 N as measured according to BS7069.

12. The artefact according to claim 8, wherein the non-stick dry film contains the ceramic coating based on an ECC composition as a top coat, and the non-stick dry film has a pencil hardness of greater than or equal to 10H at room temperature and at 200° C. as measured according to EN 12983-1:1999.

13. The artefact according to claim 8, wherein the non-stick dry film contains the ceramic coating based on an ECC composition as a top coat, and the non-stick dry film has a thermal conductivity of 2.4 to 2.6 $W \cdot m^{-1} K^{-1}$ as measured according to ASTM E-1461.

14. A method for coating an artefact comprising the steps:
   A) roughening of an artefact substrate surface,
   B) applying a base coat of a ceramic coating composition to the artefact substrate surface,
   C) applying a top coat of the enhanced ceramic coating composition according to claim 1 over the wet base coat, and
   D) curing the base coat and top coat to obtain a dry film coating of the artefact.

15. A method for obtaining an artefact coated with an enhanced ceramic coating, ECC, according to claim 7, comprising the steps of:
   providing an artefact;
   providing a first solution comprising a silica mixture, a functional filler, a ceramic powder that emits far-infrared ray-radiation and anions in a first container;
   providing a second solution comprising silane or an oligomer thereof as a binder in a second container;
   pre-agitating the first solution in the first container and the second solution in the second container;
   mixing the first solution and the second solution, thereby obtaining a non-stick ceramic coating composition, CCC;
   agitating the non-stick ceramic coating composition CCC;
   maturing the non-stick ceramic coating composition CCC;

adding a diamond additive to the non-stick ceramic coating composition CCC to obtain an enhanced ceramic coating ECC composition, containing 0.2 wt %-2 wt % diamond additive;

filtering the ECC composition;

applying the ECC composition onto the artefact as a base coating or a further coating; and curing the ECC composition, thereby obtaining an artefact coated with a film containing the ECC.

16. A method for improving the non-stick durability of a ceramic coating comprising adding 0.2 wt %-2 wt % diamond additive to a sol-gel type ceramic coating composition comprising a silane or an oligomer thereof, silica, a functional filler and a ceramic powder that emits far infrared radiation and anions, thus obtaining an ECC composition according to claim 1, with wt % compared to the total weight of the ECC composition.

17. The method according to claim 16, wherein the sol-gel type ceramic coating composition CCC comprises
   (a) 11-20 wt % of a silane or an oligomer thereof as a binder;
   (b) 19.5-41.5 wt % of a silica mixture;
   (c) 3-19 wt % of a functional filler; and
   (d) 2-15 wt % of a ceramic powder that emits far infrared radiation and anions; with wt % compared with the total weight of the CCC.

18. The method according to claim 16, wherein the diamond additive comprises diamond particles and mica particles in a weight ratio diamond particles: mica particles between 1:0 and 1:3.

19. The ECC composition according to claim 1, wherein the diamond additive comprises diamond particles and mica particles in a weight ratio diamond particles:mica particles between 1:2 and 1:3.

20. The ECC composition according to claim 1, comprising between 0.1 wt % and 0.4 wt % diamond particles, with wt % compared to the total weight of the ECC composition.

21. The ECC composition according to claim 1, wherein the sol-gel type ceramic coating composition comprises:
   (a) 40-50 wt % of a silane or an oligomer thereof as a binder;
   (b) 27-34 wt % of a silica mixture;
   (c) 3-19 wt % of a functional filler;
   (d) 2-15 wt % of a ceramic powder that emits far infrared radiation and anions;
with wt % compared with the total weight of the non-stick sol-gel type ceramic coating composition.

* * * * *

UNITED STATES PATENT AND TRADEMARK OFFICE
CERTIFICATE OF CORRECTION

| | | |
|---|---|---|
| PATENT NO. | : 10,793,477 B2 | Page 1 of 2 |
| APPLICATION NO. | : 15/572514 | |
| DATED | : October 6, 2020 | |
| INVENTOR(S) | : Jan Helskens and Park Chung Kwon | |

It is certified that error appears in the above-identified patent and that said Letters Patent is hereby corrected as shown below:

On the Title Page

Under the Abstract "21 Claims, 4 Drawing Sheets" should read --23 Claims, 4 Drawing Sheets-- as per the attached title page.

In the Claims

Column 26, after Line 23, add the following claims:
--22. The method according to claim 7, wherein the artefact is a cookware item.
23. The artefact according to claim 8, wherein the artefact is a cookware item.--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

(12) United States Patent
Helskens et al.

(10) Patent No.: US 10,793,477 B2
(45) Date of Patent: Oct. 6, 2020

(54) ENHANCED CERAMIC COATING

(71) Applicants: Jan Helskens, Destelbergen (BE); THERMOLON KOREA CO., LTD., Busan (KR)

(72) Inventors: Jan Helskens, Destelbergen (BE); Park Chung Kwon, Busan (KR)

(73) Assignee: THERMOLON KOREA CO., LTD., Busan (KR)

(*) Notice: Subject to any disclaimer, the term of this patent is extended or adjusted under 35 U.S.C. 154(b) by 268 days.

(21) Appl. No.: 15/572,514

(22) PCT Filed: May 23, 2016

(86) PCT No.: PCT/EP2016/061556
§ 371 (c)(1),
(2) Date: Nov. 8, 2017

(87) PCT Pub. No.: WO2016/188946
PCT Pub. Date: Dec. 1, 2016

(65) Prior Publication Data
US 2018/0170815 A1    Jun. 21, 2018

(30) Foreign Application Priority Data
May 22, 2015   (EP) ..................... 15168906

(51) Int. Cl.
*C04B 35/00* (2006.01)
*C04B 35/624* (2006.01)
(Continued)

(52) U.S. Cl.
CPC ............ *C04B 35/624* (2013.01); *B05D 3/002* (2013.01); *B05D 3/0254* (2013.01); *B05D 7/542* (2013.01);
(Continued)

(58) Field of Classification Search
None
See application file for complete search history.

(56) References Cited

U.S. PATENT DOCUMENTS 6,319,108 B1    11/2001  Adefris et al.
2008/0017074 A1*  1/2008  Park .................. A47J 36/04
                                        106/404
2014/0120284 A1*  5/2014  Perillon ............ A47J 36/06
                                        428/35.9

FOREIGN PATENT DOCUMENTS

CN    103 205 201 A   7/2013
CN    103254767 A     8/2013
(Continued)

OTHER PUBLICATIONS

KR-20030078841-A—english translation (Year: 2003).*
(Continued)

*Primary Examiner* — Stefanie J Cohen
(74) *Attorney, Agent, or Firm* — Amster, Rothstein & Ebenstein LLP

(57) ABSTRACT

The present invention relates to an enhanced ceramic coating, ECC, composition comprising a non-stick ceramic coating composition, CCC, and 0.2 wt %-2 wt % diamond additive, DA with wt % compared with the total weight compared to the ECC composition. It also relates to a method of coating an artefact with the ECC, and an artefact provided 5 with a dry film coating containing an ECC prepared using an ECC composition of the invention. An artefact coated with the ECC has the combined advantages of durable non-stick, scratch resistance and abrasion resistance.

23 Claims, 4 Drawing Sheets